United States Patent
Elovici et al.

(10) Patent No.: US 12,464,373 B2
(45) Date of Patent: Nov. 4, 2025

(54) OPTIMIZED WIFI NETWORK

(71) Applicant: Deutsche Telekom AG, Bonn (DE)

(72) Inventors: Yuval Elovici, Arugot (IL); Oleg Brodt, Beer Sheva (IL); Asaf Shabtai, Hulda (IL); Rami Puzis, Ashdod (IL); David Mimran, Tel Aviv (IL)

(73) Assignee: DEUTSCHE TELEKOM AG, Bonn (DE)

( * ) Notice: Subject to any disclaimer, the term of this patent is extended or adjusted under 35 U.S.C. 154(b) by 548 days.

(21) Appl. No.: 17/901,926

(22) Filed: Sep. 2, 2022

(65) Prior Publication Data

US 2023/0076045 A1 Mar. 9, 2023

(30) Foreign Application Priority Data

Sep. 5, 2021 (IL) .......................................... 286168

(51) Int. Cl.
*H04W 16/26* (2009.01)
*H04W 16/22* (2009.01)
*H04W 24/02* (2009.01)
*H04W 84/12* (2009.01)

(52) U.S. Cl.
CPC .......... *H04W 16/26* (2013.01); *H04W 16/22* (2013.01); *H04W 24/02* (2013.01); *H04W 84/12* (2013.01)

(58) Field of Classification Search
CPC ..... H04W 16/26; H04W 16/22; H04W 24/02; H04W 84/12; H04W 84/18; H04W 88/04; B62D 55/075; B62D 57/00
See application file for complete search history.

(56) References Cited

U.S. PATENT DOCUMENTS

| | | | |
|---|---|---|---|
| 2011/0234454 A1* | 9/2011 | Mathews | G01S 5/021 342/450 |
| 2017/0111102 A1* | 4/2017 | Fan | H04W 4/023 |
| 2019/0021136 A1* | 1/2019 | Pogorelik | G05D 1/0274 |
| 2021/0258754 A1* | 8/2021 | Bolot | H04B 7/2606 |
| 2024/0081773 A1* | 3/2024 | Steines | A61B 6/548 |

FOREIGN PATENT DOCUMENTS

CN 109218962 A * 1/2019 ............ H04W 64/00

* cited by examiner

*Primary Examiner* — Yuwen Pan
*Assistant Examiner* — Swati Jain
(74) *Attorney, Agent, or Firm* — LEYDIG, VOIT & MAYER, LTD.

(57) ABSTRACT

An optimized limited-area WiFi network includes a plurality of Internet connectable devices, a wireless router for facilitating Internet connectivity, and a dynamically positionable signal coverage enhancer configured with an onboard processor, a signal coverage enhancing element, and mobile means. The signal coverage enhancer is repositionable, by the mobile means in response to a command signal transmitted by the processor, to a determined location of the limited-area WiFi network that is sufficiently close to one or more of the devices, such that an amplified signal produced by the signal coverage enhancing element which amplifies a wireless signal transmitted by the router maintains uninterrupted Internet operation of the to one or more devices.

8 Claims, 3 Drawing Sheets

OPTIMIZED WIFI NETWORK

CROSS REFERENCE TO RELATED APPLICATIONS

This application claims benefit to Israel Patent Application No. IL 286168, filed on Sep. 5, 2021, which is hereby incorporated by reference herein.

FIELD

The present invention relates to the field of field of wireless communication. More particularly, the invention relates to a WiFi network that is able to dynamically optimize signal strength and location based on actual consumption and AI-based consumption predictions.

BACKGROUND

A wireless router providing Internet access is commonly used in a home or small office WiFi network that links two or more digital devices using wireless communication to form an indoor wireless local area network (WLAN) within a limited area. However, many zones within the WLAN at a distance from the router are exposed to little or to no Internet connection. Consequently, the devices operating in the WLAN often suffer from a quality of service problem within the limited area due to the attenuation of signal strength and the need for a plurality of access points to ensure sufficiently good signal strength. Also, the range and coverage of the signal produced by the router within the limited area tend to be fixed and limited, while users of the WiFi network are generally mobile and deploy their devices dynamically, leading to a mismatch between user needs and the network signal parameters.

Attempts have been made to improve the signal coverage within the limited area of the WLAN by adding a range extender that elongates the signal area or by employing a plurality of mesh Wi-Fi units (wireless routers that support multiple Wi-Fi base stations for extended coverage throughout the home. Unlike range extenders, mesh Wi-Fi units do not create a separate network. They provide a single network that users' mobile devices connect to automatically as they move around the house) that piggyback on one another to produce a continuous wireless link throughout the limited area while the devices switch between mesh units automatically. Although range extenders and mesh units improve signal coverage, the implementation of these devices creates various problems such as increased radiation, less physical control over the network and more vulnerability for cyber-attackers.

Even though technology has evolved dramatically in the recent decade, home networking stayed pretty much the same. We indeed have higher internet speed thanks to the internet service provider and WIFI technology, but coverage is still a problem at home. Not every home is built the same. We have many more internet consumer devices at home, some mobile and some in a fixed location. Creating solid coverage with your hotspot for everyone is sometimes an impossible task. Most of the time, it comes with an excessive electromagnetic emissions toll created by WIFI extenders. You can put many WIFI extenders at home to get good coverage, but that would make a severe radiation problem, while if you are careful about the number of extenders, the coverage will be hurt. Mainly because we tend to move all around the house with our devices and the WIFI coverage is static by nature.

SUMMARY

In an embodiment, the present disclosure provides an optimized limited-area WiFi network, comprising: a plurality of Internet connectable devices, a wireless router for facilitating Internet connectivity, and a dynamically positionable signal coverage enhancer configured with an onboard processor, a signal coverage enhancing element, and mobile means, wherein said signal coverage enhancer is repositionable, by said mobile means in response to a command signal transmitted by said processor, to a determined location of said limited-area WiFi network that is sufficiently close to one or more of said devices, such that an amplified signal produced by said signal coverage enhancing element which amplifies a wireless signal transmitted by said router maintains uninterrupted Internet operation of said to one or more devices.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

It is an aspect of the present invention provides a limited-area WiFi network having good signal coverage and lacking the disadvantages of the prior art.

An optimized limited-area WiFi network, comprising a plurality of Internet connectable devices, a wireless router for facilitating Internet connectivity, and a dynamically positionable signal coverage enhancer configured with an onboard processor, a signal coverage enhancing element, and mobile means, wherein the signal coverage enhancer is repositionable, by the mobile means in response to a command signal transmitted by the processor, to a determined location of the limited-area WiFi network that is sufficiently close to one or more of the devices, such that an amplified signal produced by the signal coverage enhancing element which amplifies a wireless signal transmitted by the router maintains uninterrupted Internet operation of the to one or more devices.

The dynamically positionable signal coverage enhancer may be a robot, including a self-propelled robot.

The robot may be self-propelled by a plurality of wheels and a cooperating propulsion unit.

The robot may be configured to traverse a staircase to another story of a building.

The processor of the dynamically positionable signal coverage enhancer may be configured with an Artificial Intelligence (AI) module that helps in learning user WiFi demand patterns.

The Artificial Intelligence (AI) module may have one or more algorithms configured to locate users connected or intended to be connected to the Internet and to learn their movement and WiFi consumption patterns.

The artificial intelligence module may be configured to predict a demand pattern so as to cause the dynamically positionable signal coverage enhancer to be repositioned to the determined location before an Internet connection event is initiated.

The processor may be configured to command the mobile means to cause repositioning of the signal coverage enhancer to the determined location where a signal strength of the produced amplified signal is increased relative to another location of the limited-area WiFi network that is closer to the router than the determined location.

The signal coverage enhancing element may be a range extender or a mesh WiFi unit.

Figure 1:
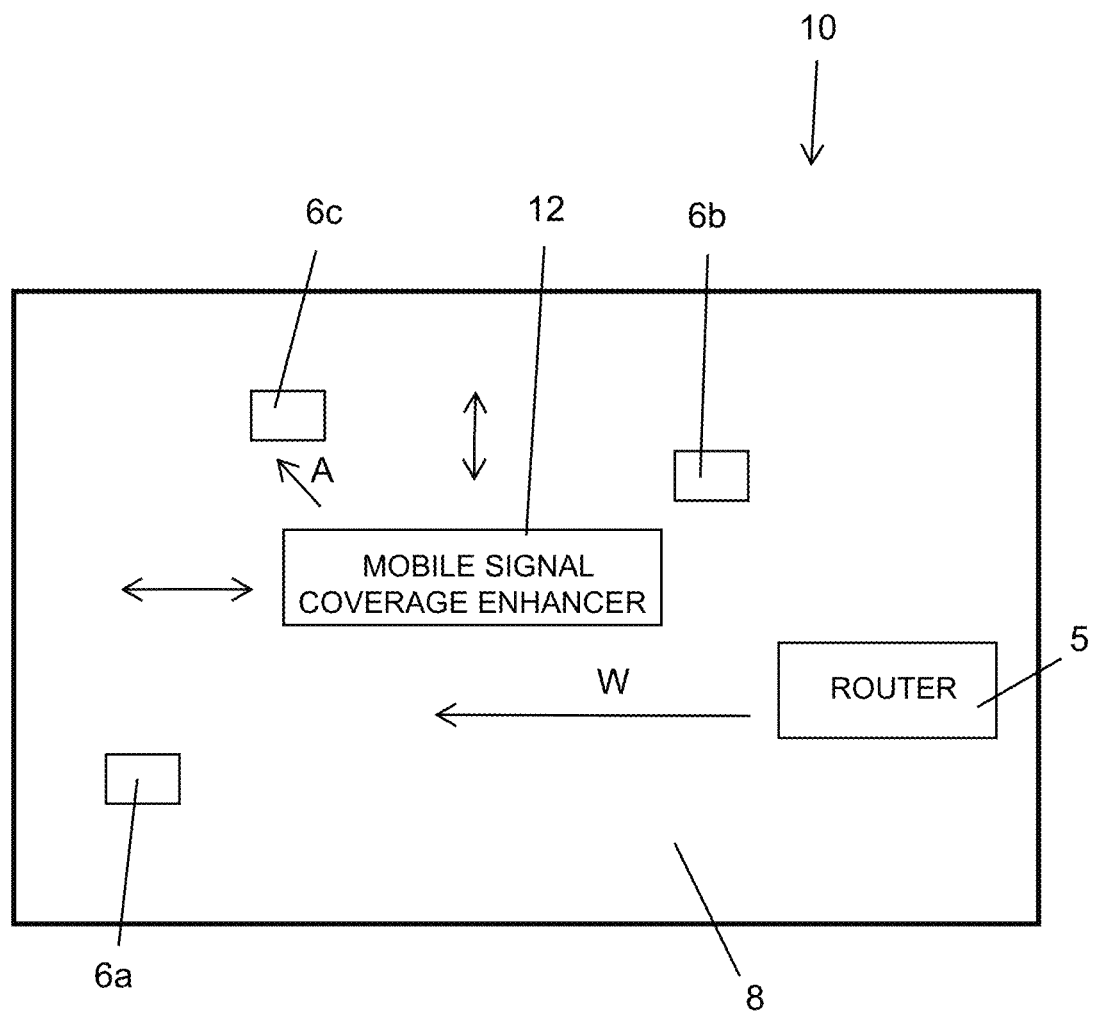
FIG. 1 schematically illustrates an embodiment of a limited-area WiFi network.

FIG. 1 schematically illustrates an embodiment of a limited-area WiFi network 10. WiFi network 10 comprises stationary wireless router 5 for facilitating Internet connectivity and a plurality of digital devices, for example, devices 6a-c, adapted to receive a wireless communication signal W from router 5.

At times, one or more of the devices, for example, devices 6a and 6c, are located within the limited area 8, such as a house or a small office, beyond the designed range of signal W, which may be for example a data signal or a command signal. Without the implementation of the invention, a plurality of signal coverage enhancers, such as range extenders and mesh units, need to be employed in order to generate corresponding high radiation and high power amplified signals that ensure that all devices will have uninterrupted Internet access. In addition to generating a high level of radiation, the plurality of signal coverage enhancers generates amplified signals that propagate outwardly from the physical boundaries of the limited area, allowing the WiFi network to be susceptible to cyber-attacks.

To reduce the radiation to which users are exposed within limited area 8 as well as to reduce unwanted costs, WiFi network 10 employs a single mobile signal coverage enhancer 12. When device 6a is operated, signal coverage enhancer 12 is displaced to the proximity of device 6a and is activated to supply device 6a with sufficient WiFi coverage. Likewise, when device 6a ceases to operate and device 6c is operated, signal coverage enhancer 12 is displaced to the proximity of device 6c while continuing to be activated to supply device 6c with sufficient WiFi coverage. At this location of signal coverage enhancer 12, device 6a is not supplied with sufficient WiFi coverage. If both devices 6a and 6c are operated, signal coverage enhancer 12 may be displaced to an intermediate location therebetween that is sufficiently close to both devices 6a and 6c to maintain uninterrupted operation. In this fashion, signal coverage is able to be optimized even when more than one user is interfacing with the Internet.

By being displaced to the proximity of a device, such as device 6c, signal coverage enhancer 12 generates amplified signal A, which amplifies communication signal W transmitted from router 5 with the sufficient signal strength to maintain uninterrupted operation of device 6c, with sufficiently low power to avoid propagating from the physical boundaries of limited area 8 and being exposed to a cyber-attack.

Of course, more than one signal coverage enhancer 12 may be employed if the limited area 8 is relatively large, each signal coverage enhancer 12 being deployed in a different sector of the limited area.

Signal coverage enhancer 12 may be displaced by any suitable mobile means well known to those skilled in the art, such as rails that extend throughout limited area 8 and a motorized mechanism that is able to interface with the rails in response to a command signal transmitted by an onboard processor, or a self-propelled device, e.g. a robot.

In another embodiment, each device is supplied with sufficient WiFi coverage by a mobile router. While the access point is stationary, the router is caused to be displaced by any suitable mobile means. When the router is displaced, the generated wireless signal will provide sufficient coverage for a specific digital device.

Figure 2:
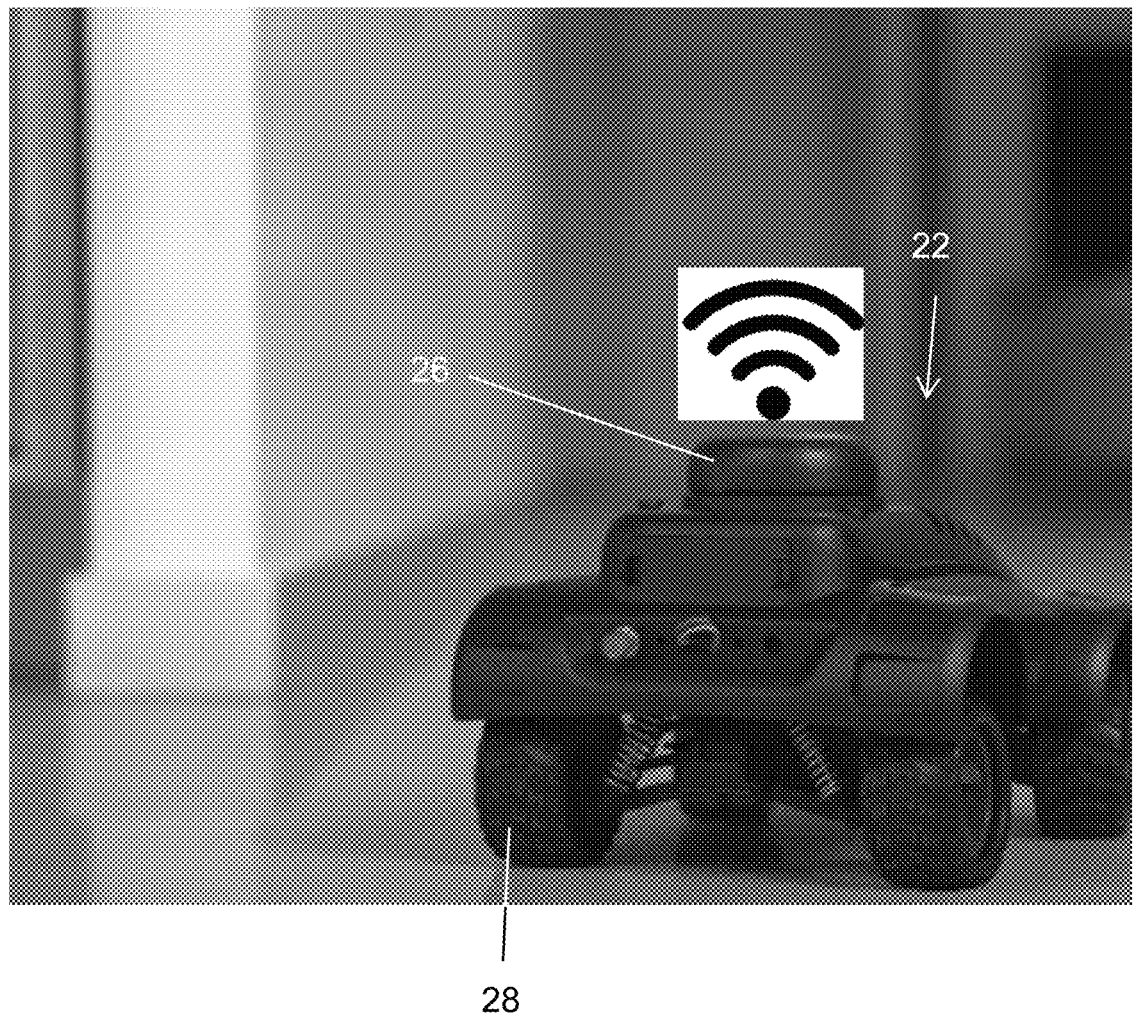
FIG. 2 depicts a signal coverage enhancer.

In the embodiment illustrated in FIG. 2, the signal coverage enhancer is a robot 22, which is generally autonomous. Robot 22 is configured to independently move within the limited area whereat it is deployed in response to real-time user information recorded in a router-associated wireless communication log.

Robot 22 carries an enhancing element 26, such as a range extender or a mesh unit, and is able to be self-propelled by a plurality of wheels 28 and a cooperating propulsion unit, such as a motor and gear train, to the vicinity of a user of the WiFi network whose device is connected to the Internet. A processor also carried by the robot commands the robot to move to a location where the signal strength of the signal produced by enhancing element 26 is increased or even maximized, so that the user at that location will benefit from good WiFi coverage during an actual Internet connection event. Enhancing element 26 may be a plug-in component adapted to be coupled in a socket provided in the robot chassis, or may be prefabricated in a dedicated robot chassis.

Alternatively, the robot may be a walking robot or one equipped with caterpillar tracks, to enable displacement along a staircase to another story of the building.

While prior art WiFi networks employ a large number of signal enhancing elements to maintain WiFI coverage for the large number of Internet-connected devices used in a given household or working place, producing a correspondingly high level of injurious radiation, a WiFi network employing robot 22 advantageously needs only a single signal enhancing element 26 to maintain WiFI coverage with minimal radiation for a large number of Internet-connected devices.

In order to achieve the prolonged mobility needed for speedily providing WiFi on demand with minimal radiation, robot 22 may be equipped with a large-capacity rechargeable battery and a camera-based navigation system that helps the robot to see and avoid furniture and other obstacles, possibly in conjunction with a machine learning capability.

The processor of robot 22 may be configured with an artificial intelligence module that helps in learning user WiFi demand patterns. The artificial intelligence module is configured to predict a demand pattern so as to cause the dynamically positionable signal coverage enhancer to be repositioned to the determined location before an Internet connection event is initiated. Rather than moving to a specific location after determining that a device is connected to the Internet, robot 22 is able to predict a demand pattern and traverse the limited area to the specific location before the user initiates an Internet connection event, to ensure superior Wi-Fi coverage. The specific location may be associated with a predetermined IP or MAC address that is identifiable for example following transmission of a handshake signal, or alternatively may be associated with a predetermined geographical location within the limited area. A typical predicted WiFi demand pattern may be characterized by a lack of WiFi usage by a child user during school time hours and WIFi usage after the child arrives home from school.

The artificial intelligence module relies on one or more intelligent algorithms configured to locate the users connected or intended to be connected to the Internet and to learn their movement and WiFi consumption patterns. After the artificial intelligence module determines the best location within the limited area to supply optimal WiFi service, robot 22 moves to the determined best location to supply WIFI services to specified users.

Figure 3:
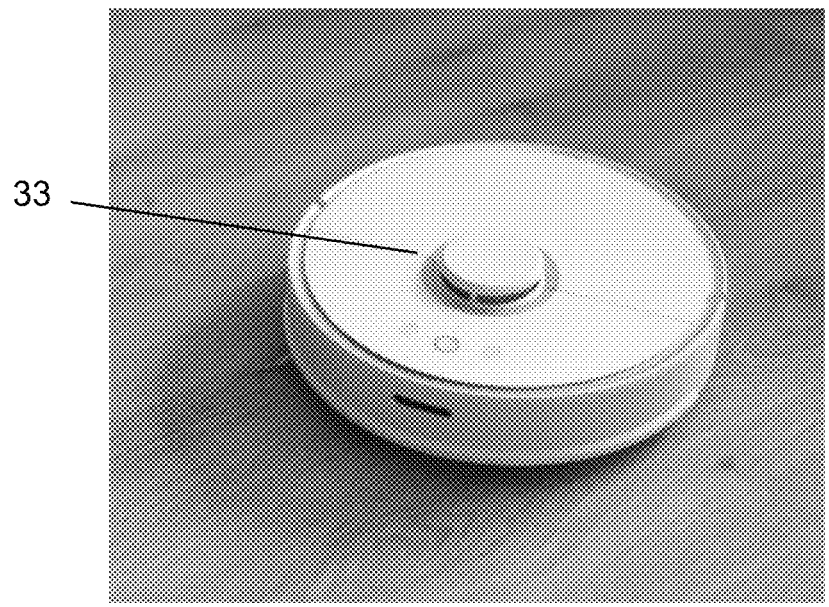
FIG. 3 depicts an autonomous cleaning robot.
Figure 4:
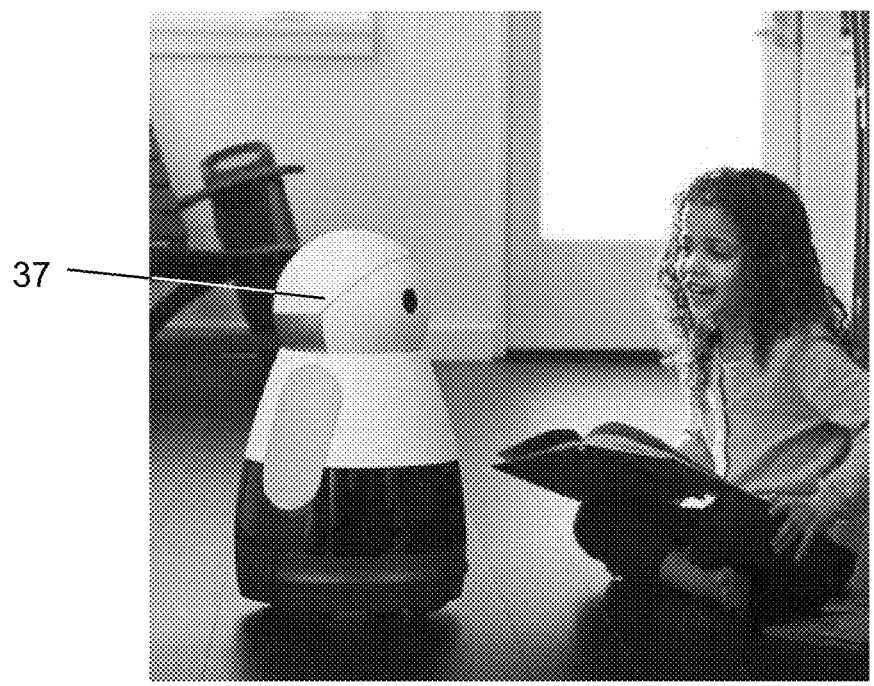
FIG. 4 depicts a home companion robot.

Some of the hardware and software of robot 22 may be incorporated into existing home robots, such as an autonomous cleaning robot 33 shown in FIG. 3, which is generally idle and underutilized, and a home companion robot 37 shown in FIG. 4, for reduced costs.

As can be appreciated from the foregoing description, the dynamically positionable signal coverage enhancer helps to reduce the number of WiFi antennas in an indoor local wireless network relative to the prior art, leading to lower radio emission, reduced health risks, and increased sustainability.

This invention creates a small and intelligent WiFi-extending robot moving around your house freely and on the hunt for WIFI consumers with low coverage. Once it identifies such a case, it moves autonomously into the most optimal location for magnifying the WIFI where the internet device will get solid coverage with minimum excessive radiation for the rest. It is possible for several robots like that cooperating with each other to provide the best internet connectivity for everyone and at any time.

The present invention provides a technology (called GreenFi) to reduce the radiation to which users are exposed, which is aimed to serve as a mobile hotspot solution that works in the following manner:

1. Every once in a while, the robot(s) scan(s) the house and records the WIFI coverage level in every spot and the level of electromagnetic emissions in that area. Except for monitoring the coverage, it also records stationary internet consumers around the house, and repetitive locations mobile internet consumers are located at, such as the living room or on the porch.

2. With that knowledge, the robots are always on the hunt monitoring internet devices connected to WIFI and their location in and around the house using in-home triangulation technology and using that knowledge to move around and reposition themselves so everyone at every point in time will get the best coverage.

3. The robot(s) can move preemptively, based upon WIFI consumption predictions.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An optimized limited-area WiFi network, comprising:
a wireless router for transmitting a wireless communication signal to facilitate Internet connectivity, a plurality of Internet connectable devices each adapted to receive said communication signal, and a robot constituting a dynamically positionable signal coverage enhancer configured with an onboard processor, a signal coverage enhancing element for generating signal which amplifies said communication signal, and mobile means,
wherein said signal coverage enhancing element comprises WiFi coverage level scanning means, electromagnetic emission level scanning means, and location recording means for each of the plurality of Internet connectable devices that are connected to said limited-area WiFi network,
wherein said robot is repositionable, by said mobile means in response to data detected by said signal coverage enhancing element and a resulting command signal transmitted by said processor, to:
a) a first location within said limited-area WiFi network whereat all of the plurality of Internet connectable devices that are connected to said limited-area WiFi network have an optimized WiFi coverage level and a minimum electromagnetic emission level at every first point in time and a first of the plurality of Internet connectable devices has solid WiFi coverage, and
b) a second location within said limited-area WiFi network whereat all of the plurality of Internet connectable devices that are connected to said limited-area WiFi network have an optimized WiFi coverage level and a minimum electromagnetic emission level at every second point in time and a second of the plurality of Internet connectable devices has solid WiFi coverage.

2. The network according to claim 1, wherein the robot is self-propelled.

3. The network according to claim 2, wherein the robot is self-propelled by a plurality of wheels and a cooperation propulsion unit.

4. The network according to claim 2, wherein the robot is configured to traverse a staircase to another story of a building.

5. The network according to claim 1, wherein the processor of the dynamically positionable signal coverage enhancer is configured with an Artificial Intelligence (AI) module having one or more movement and WiFi consumption pattern learning algorithms,
wherein said one or more algorithms are applied to data detected by the signal coverage enhancing element until movement and WiFi consumption patterns of users of the plurality of Internet connectable devices that are connected to the limited-area WiFi network are learned,
wherein the processor is configured to generate the command signal causing the robot to be repositioned to the first and second locations in response to the movement and WiFi consumption patterns output by the artificial intelligence module.

6. The network according to claim 1, wherein the processor is configured to command the mobile means to cause repositioning of the signal coverage enhancer to the first or second location where a signal strength of the generated amplified signal is increased relative to another location of the limited-area WiFi network.

7. The network according to claim 1, wherein the signal coverage enhancing element is a range extender or a mesh WiFi unit.

8. The network according to claim 5, wherein the signal coverage enhancer is configured to generate the amplified signal at the first or second location with sufficient signal strength to maintain uninterrupted operation for each of the plurality of Internet connectable devices and with sufficiently low power to avoid propagating from physical boundaries of a limited area associated with the limited-area WiFi network to avoid exposure to a cyber-attack.

* * * * *